(12) United States Patent
Kuboshima et al.

(10) Patent No.: US 6,183,904 B1
(45) Date of Patent: Feb. 6, 2001

(54) STORAGE BATTERY TERMINAL STRUCTURE

(75) Inventors: Hidehiko Kuboshima; Nobuaki Yoshioka; Akira Maeda; Kazuhisa Ishizaki; Mitsuhiro Matsumoto, all of Shizuoka; Hajime Satoh, Kanagawa; Satoru Chujo, Kanagawa; Sinji Nakamoto, Kanagawa; Katsuhiro Imaizumi, Kanagawa, all of (JP)

(73) Assignees: Yazaki Corporation, Tokyo; Nissan Motor Co., Ltd., Kanagawa, both of (JP)

( * ) Notice: Under 35 U.S.C. 154(b), the term of this patent shall be extended for 0 days.

(21) Appl. No.: 09/471,003

(22) Filed: Dec. 23, 1999

Related U.S. Application Data

(62) Division of application No. 08/834,919, filed on Apr. 7, 1997, now Pat. No. 6,030,722.

(30) Foreign Application Priority Data

Apr. 8, 1996 (JP) .................................................... 8-85265
Mar. 31, 1997 (JP) .................................................... 9-80925

(51) Int. Cl.[7] ...................................................... H01M 2/30
(52) U.S. Cl. ............................ 429/178; 439/352; 439/757
(58) Field of Search .................................... 429/178, 179; 439/759, 757, 352

(56) References Cited

U.S. PATENT DOCUMENTS 4,072,388  2/1978  Dunn ..................................... 339/103
5,044,995  * 9/1991  Carson .
5,556,309  * 9/1996  Sharpe et al. .

FOREIGN PATENT DOCUMENTS

| 19 43 464 | 8/1966 | (DE) . |
| 12 50 519 | 9/1967 | (DE) . |
| 19 77 458 | 1/1968 | (DE) . |
| 21 58 525 | 5/1972 | (DE) . |
| 22 50 373 | 4/1973 | (DE) . |
| 23 19 005 | 10/1974 | (DE) . |
| 39 42 241 A1 | 6/1991 | (DE) . |

* cited by examiner

*Primary Examiner*—John S. Maples
(74) *Attorney, Agent, or Firm*—Sughrue, Mion, Zinn, Macpeak & Seas, PLLC

(57) ABSTRACT

A storage battery terminal structure of the present invention includes: an annular recessed groove that is arranged on an upper end portion of a cylindrical male terminal; retaining projections that are engageable with the annular recessed groove; a housing that is an outer enclosing body of a female terminal; flexible arms, each flexible arm not only having a retaining projection on an upper end portion of an inner wall of a rigid sleeve of the housing surrounding the male terminal in order to release the corresponding retaining projection from the annular recessed groove but also being formed by a pair of slits formed from an upper end of the rigid sleeve so as to interpose the corresponding retaining projection therebetween; and a release button that is arranged on an upper end portion of the rigid sleeve so as to be vertically movable so that the flexible arms can be flexed sidewards and that has slopes on a lower surface thereof, the slopes facing sidewards.

4 Claims, 15 Drawing Sheets

STORAGE BATTERY TERMINAL STRUCTURE

This is a divisional of application No. 08/834,919, filed Apr. 7, 1997, U.S. Pat. No. 6,030,722 the disclosure of which is incorporated herein by reference.

BACKGROUND OF THE INVENTION

1. Field of the Invention

The present invention relates to an easily releasable terminal structure that allows the terminals of a plurality of storage batteries to be releasably connected. More particularly, the present invention is directed to a storage battery terminal structure adapted for connecting and disconnecting storage batteries for electric vehicles.

2. Related art

Various types of storage battery terminal structures have heretofore been known. For example, a storage battery terminal structure such as shown in FIG. 16 has been proposed. FIG. 16 is an exploded perspective view showing an example of a conventional storage battery terminal structure.

In FIG. 16, a conventional storage battery terminal structure 101 includes: a male terminal 103 that is erected on the upper surface of a storage battery main body 102; and a female terminal 104 having a male terminal insertion hole 105 engageable with the male terminal 103 and a crimping portion 106 for connecting a wire W by crimping.

More specifically, an opening 107 is arranged on an end of the male terminal insertion hole 105, and a pair of projecting portions 108 are formed on both sides of the opening 107. These projecting portions 108 extend from an end of an electric contact portion 109 surrounding the male terminal insertion hole 105. Further, in order to reduce the inner diameter of the male terminal insertion hole 105 by tightening the pair of projecting portions 108 with a bolt 110 and a nut 111, through holes 112 for inserting the bolt 110 are arranged in the projecting portions 198. Further, in order to prevent excessive tightening of the bolt 110 and in order to provide an appropriate degree of tension, an L-shaped metal piece 115 formed of a washer portion 113 and a stopper portion 114 having a projecting height H is arranged.

In the thus constructed conventional storage battery terminal structure 101, the male terminal 103 is electrically connected to the male terminal insertion holed 105 in the following way. The male terminal insertion hole 105 of the electric contact portion 109 is inserted into the male terminal 103 that is usually called a "battery post". Then, the bolt 110 is inserted into the washer portion 113 and the through holes 112, and is thereafter tightened up by the nut 111. As a result, when the nut 111 comes in contact with the stopper portion 114, the male terminal insertion hole 105 tightens up the male terminal 103 with an appropriate degree of tension without pressure loss, and thus the male terminal 103 is electrically connected to the male terminal insertion hole 105 reliably.

However, in the aforementioned conventional storage battery terminal structure 101, a tightening tool must be used in order to tighten the bolt 110 and the nut 111 up. Therefore, if, for example, storage batteries are placed close to each other as in an electric vehicle or the like and the place where the storage batteries are put is so narrow as to leave only a small distance between the terminals of the batteries, there exists a problem that the tightening tool interferes with parts such as the electric contact portion 109 and the like of the adjacent storage batteries. As a result, the tightening operation becomes hard and operation efficiency is impaired.

Further, even if the storage battery terminal structure 101 is tightened up with the bolt 110 and the nut 111, whether or not the storage battery terminal structure 101 has been connected to the male terminal 103 completely cannot be checked visibly with ease, which has made the operation very inconvenient.

Still further, when the storage battery terminal structure 101 is applied to electric vehicles that employ high-voltage storage batteries, the operator is likely to touch the storage batteries directly with his hand, which has made the operation dangerous.

SUMMARY OF THE INVENTION

The present invention has been made in view of the aforementioned circumstances. An object of the present invention is therefore to provide a storage battery terminal structure that not only can provide reliable electric connection but also can attach and detach the female terminal to and from the male terminal at the touch of a button or the like without using a tool.

Another object of the present invention is to provide a storage battery terminal structure that allows the operator to check the connection between the storage battery and the storage battery terminal structure with ease.

The objects of the present invention can be achieved by a storage battery terminal structure. The storage battery terminal structure includes: a male terminal that is erected on an upper surface of a storage battery main body; and a female terminal that has a male terminal insertion hole engageable with the male terminal and a crimping portion for connecting a wire by crimping.

Such storage battery terminal structure further includes: an annular recessed groove that is arranged on an upper end portion of the male terminal that is cylindrical; a housing that has a retaining mechanism for retaining the female terminal and that serves as an outer enclosing body for the female terminal, the retaining mechanism including the annular recessed groove; and a retainment releasing mechanism that is arranged within a rigid sleeve of the housing surrounding the male terminal in order to release retainment of the retaining mechanism.

Further, the above objects can be achieved by a storage battery terminal structure of the present invention. Such storage battery terminal structure is to provide part of the retaining mechanism is retaining projections that are arranged over inner circumferential portions of the rigid sleeve; and the retainment releasing mechanism comprises: flexible arms, each flexible arm being formed by a pair of slits that are cut from an upper end of the rigid sleeve so as to interpose the corresponding retaining projection therebetween; and a release button that is arranged on an upper end portion of the rigid sleeve so as to be vertically movable so that the flexible arms are flexed sidewards and that has slopes on a lower surface thereof, the slopes facing sidewards.

In the aforementioned constructions of the storage battery terminal structures of the present invention, the female terminal is connected to the male terminal with the female terminal being retained in the annular recessed groove by the retaining projections, the annular recessed groove being arranged on the male terminal and the retaining projections serving as part of the retaining mechanism arranged on the housing that is an outer enclosing body of the female terminal. Therefore, tightening operation is not required, which in turn allows the operator to perform mounting operation at a single touch.

Further, the female terminal is removed from the male terminal by pressing the release button downward to thereby flex the flexible arms sidewards, the release button serving as the retainment releasing mechanism arranged within the rigid sleeve of the housing. As a result, retainment of the retaining projections can be released from the annular recessed groove at the touch of a button without using a tool. Therefore, removing operation efficiency can be improved even in a narrow place.

Further, the above objects can be achieved by a storage battery terminal structure of the present invention. Such storage battery terminal structure is to provided a finger resting protuberance is arranged on an upper end portion of the rigid sleeve at a position opposite to the crimping portion.

In the aforementioned constructions of the storage battery terminal structures of the present invention, the finger resting protuberance is arranged on the upper end portion of the rigid sleeve. Therefore, in order to pull the female terminal out of the male terminal, a finger is put on the bottom of the finger resting protuberance and the release button is pressed downward by the thumb or the like with the finger as a pivot. Therefore, when the finger resting protuberance is pulled up directly, the female terminal can be pulled out of the male terminal easily without having to slip the fingers. Hence, removing operation efficiency can be further improved.

Further, the above objects can be achieved by a storage battery terminal structure. Such storage battery terminal structure is to provided part of the retaining mechanism is cantilevered springs that are arranged horizontally within the rigid sleeve and that are flexible sidewards; and the retainment releasing mechanism comprises a release knob that is arranged on an upper end portion of the rigid sleeve so as to be rotatable only by a predetermined angle and that has ribs that flex front ends of the springs sidewards by catching the front ends of the springs.

In the aforementioned constructions of the storage battery terminal structures of the present invention, the female terminal is connected to the male terminal with the female terminal being retained in the annular recessed groove by the springs, the annular recessed groove being arranged on the male terminal and the springs serving as part of the retaining mechanism arranged on the housing that is an outer enclosing body of the female terminal. Therefore, tightening operation is not required, which in turn allows the operator to perform mounting operation at a single touch without using a tool.

Further, the female terminal is removed from the male terminal by rotating the release knob to thereby flex the springs sidewards, the release knob serving as the retainment releasing mechanism arranged within the rigid sleeve of the housing. As a result, retainment of the female terminal in the annular recessed groove by the springs can be released at a single touch without using a tool. Therefore, removing operation efficiency can be improved even in a narrow place.

Further, the above objects can be achieved by a storage battery terminal structure of the present invention, which includes: a male terminal that is erected on an upper surface of a storage battery main body; and a female terminal that has a male terminal insertion hole engageable with the male terminal and a crimping portion for connecting a wire by crimping.

Such storage battery terminal structure further includes: a housing that is arranged as an outer enclosing body of the female terminal; a retaining mechanism that is interposed between a rigid sleeve of the housing surrounding the male terminal and an upper surface of the storage battery main body; and a retainment releasing mechanism that is arranged on the rigid sleeve in order to release the retaining mechanism.

Further, the above objects can be achieved by a storage battery terminal structure of the present invention. Such storage battery terminal structure is to provided the retaining mechanism comprises: a flexible arm projecting upward from a lower portion of the rigid sleeve so as to be U-shaped; a retaining groove that is arranged on an upper lateral side of the flexible arm; a retaining rib that has an inverted L-shaped portion being engageable with the retaining groove and that is erected on an upper surface of the storage battery main body; and the retainment releasing mechanism comprises a finger resting stepped portion being arranged on an upper end of the flexible arm; and a finger resting protuberance that is arranged on the upper end of the rigid sleeve at a position opposite to the flexible arm.

In the aforementioned constructions of the storage battery terminal structures of the present invention, the female terminal can be connected to the male terminal at a single touch by pushing down the female terminal covered by the housing from above the male terminal, and the female terminal can be removed from the male terminal easily without using a tool by pulling the female terminal up with the finger resting stepped portions flexed inward while putting the fingers on the finger resting protuberances. Therefore, even in a narrow space with a distance between the terminals being short, the storage batteries can be replaced within a short period of time, which in turn contributes to improving operability.

Further, the annular recessed groove is no longer required to be machined in the male terminal, and no release button nor release knob is required. As a result, inexpensive products can be provided.

Further, the above objects can be achieved by a storage battery terminal structure of the present invention. Such storage battery terminal structure is to provide the retaining mechanism comprises: a pair of flexible arms projecting upward from a lower portion of the rigid sleeve so as to be U-shaped and being arranged at opposite positions; retaining projections that are arranged outside the flexible arms; a retaining rib that has an inverted L-shaped portion for retaining the retaining projections and that is erected on an upper surface of the storage battery main body so as to be substantially half-arcuate; and the retainment releasing mechanism is a pair of finger resting stepped portions being arranged on upper ends of the flexible arms.

In the aforementioned constructions of the storage battery terminal structures of the present invention, the female terminal can be connected to the male terminal at a single touch by pushing down the female terminal covered by the housing from above the male terminal, and the female terminal can be removed from the male terminal easily without using a tool by pulling the female terminal up with the pair of flexible arms flexed inward while putting the fingers on the pair of finger resting stepped portions. Therefore, even in a narrow space with a distance between the terminals being short, the storage batteries can be replaced within a short period of time, which in turn contributes to improving operability.

The object of the present invention, which is to sense the connection between the storage battery and the storage battery terminal structure, can be achieved by a storage battery terminal structure that includes: a male terminal that is erected on an upper surface of a storage battery main body; and a female terminal that has a male terminal insertion hole engageable with the male terminal and a crimping portion for connecting a wire by crimping. Such storage battery terminal structure further includes: an indicator. The indicator includes: a slide hole that is formed along the length of the female terminal within a housing that covers the female terminal; an indication rod that is inserted into the slide hole and that shuttles along the slide hole; and an indication opening that is an end of the slide hole and that allows one end of the indication rod 95 to project when the male terminal has been inserted into the male terminal insertion hole completely.

Further, a construction of the present invention is characterized as arranging not only a stepped portion within the slide hole but also a flexible lock catch that is elastically flexibly deformed with respect to the indication rod and that prevents the coming off from the slide hole while retained by the stepped portion. Therefore, the indication rod will in no way come out unexpectedly during transportation of or operation over the storage battery terminal structure as a component. In addition, the connected condition can be indicated reliably.

DETAILED DESCRIPTION OF THE PREFERRED EMBODIMENTS

Figure 1:
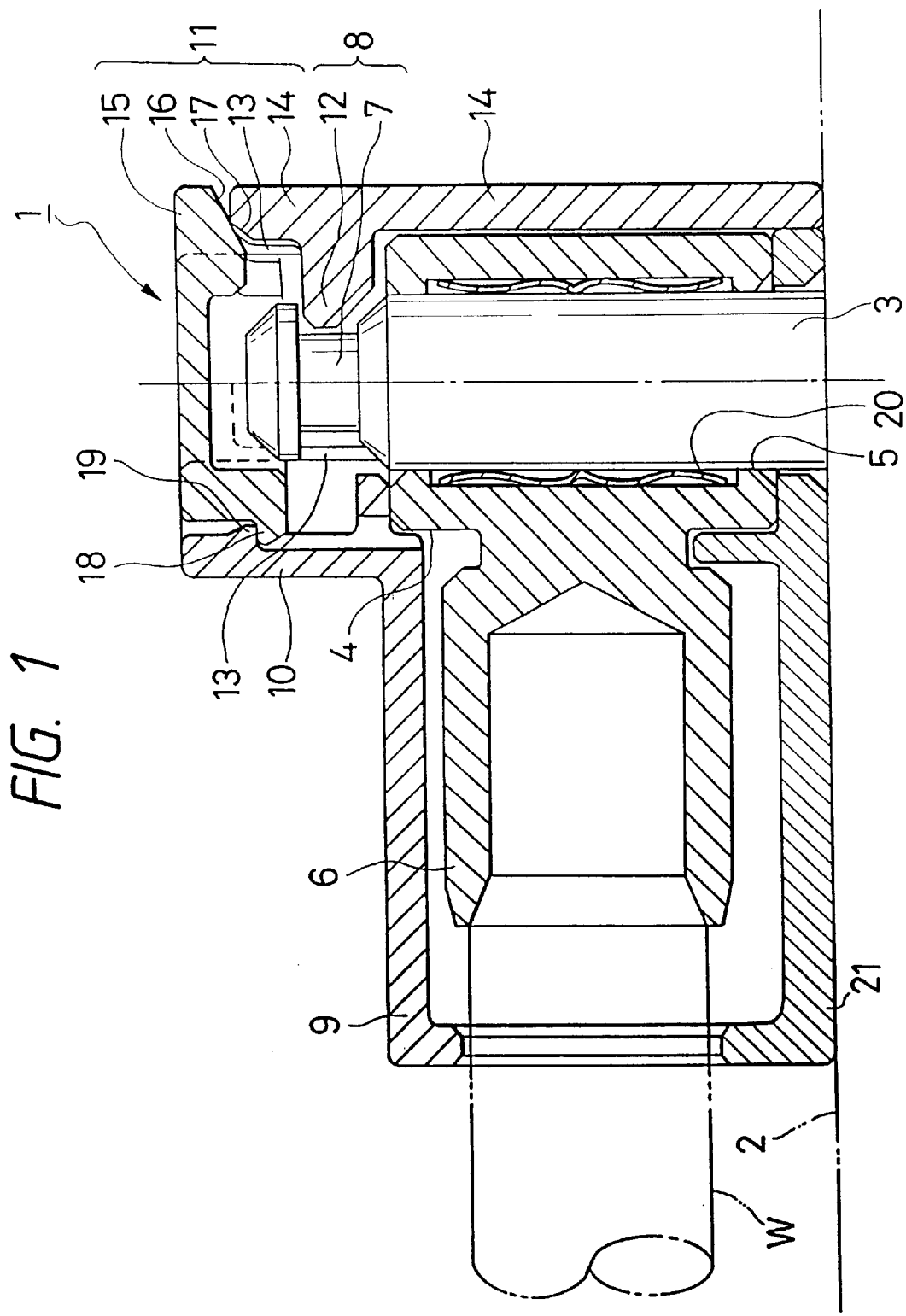
FIG. 1 is a sectional view showing a storage battery terminal structure, which is a first embodiment of the present invention, the sectional view being taken along a line A—A in FIG. 2.
Figure 2:
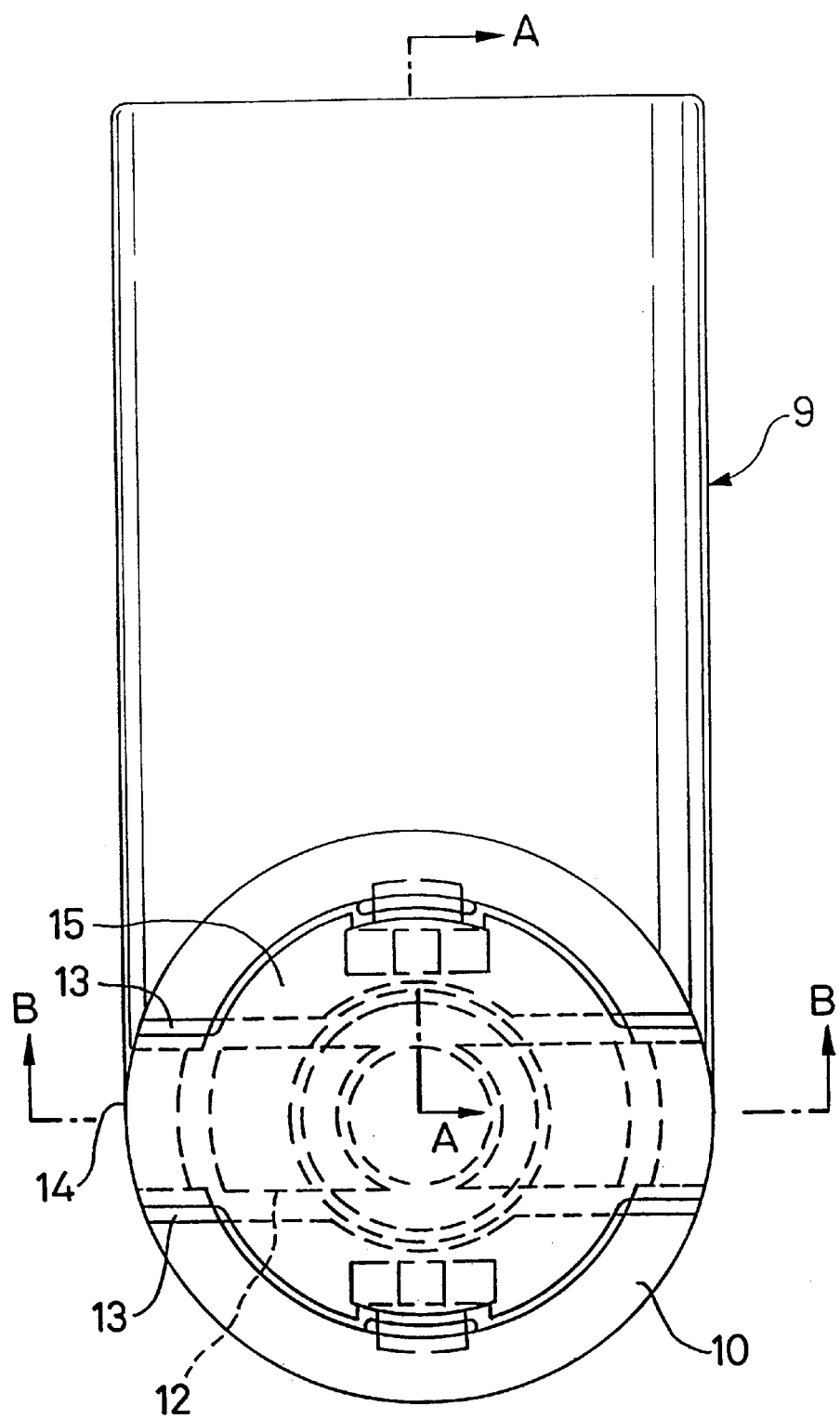
FIG. 2 is a plan view of the storage battery terminal structure shown in FIG. 1.
Figure 3:
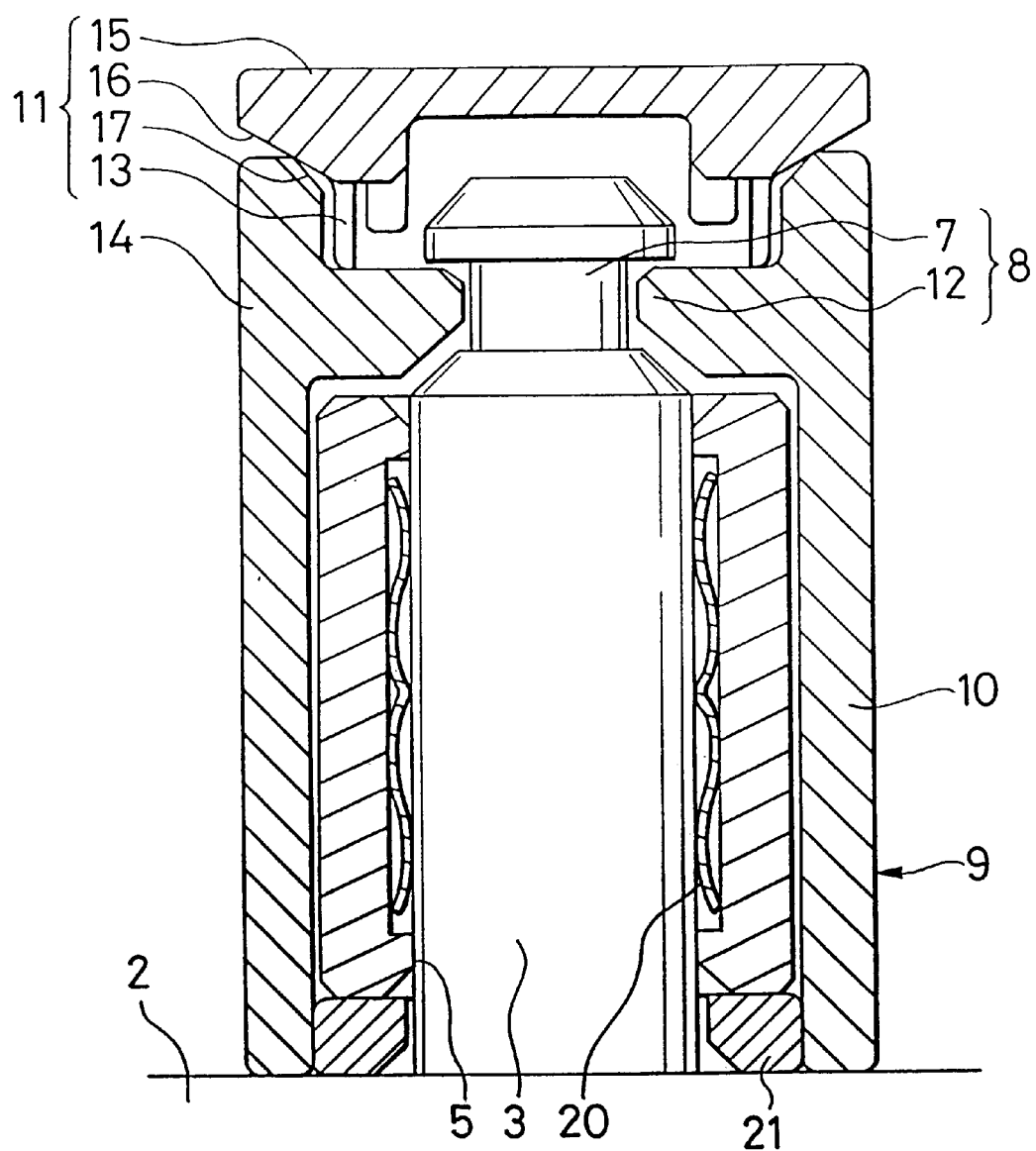
FIG. 3 is a sectional view taken along a line B—B in FIG. 2.
Figure 4:
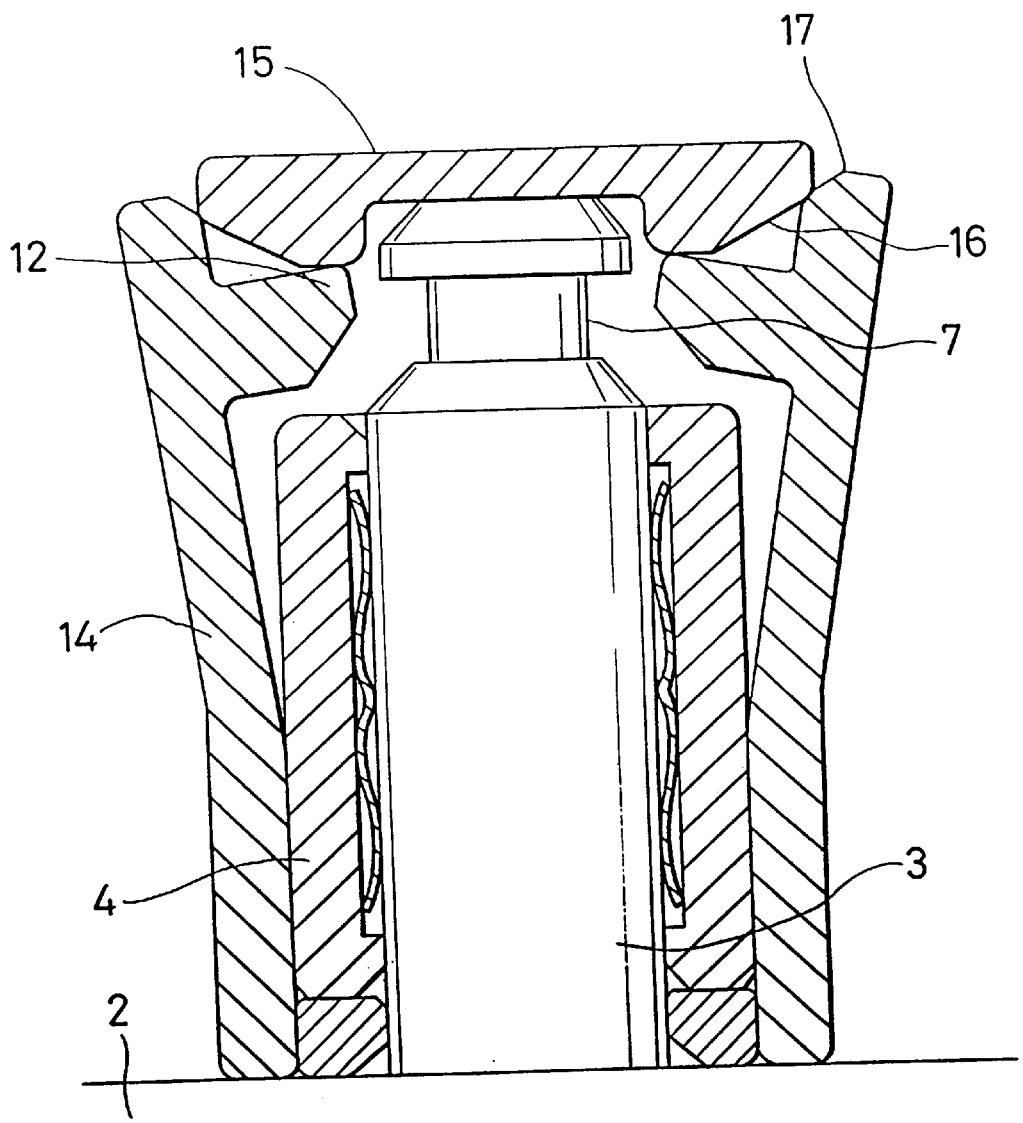
FIG. 4 is a diagram illustrative of an operation at the time of releasing in FIG. 1.
Figure 5:
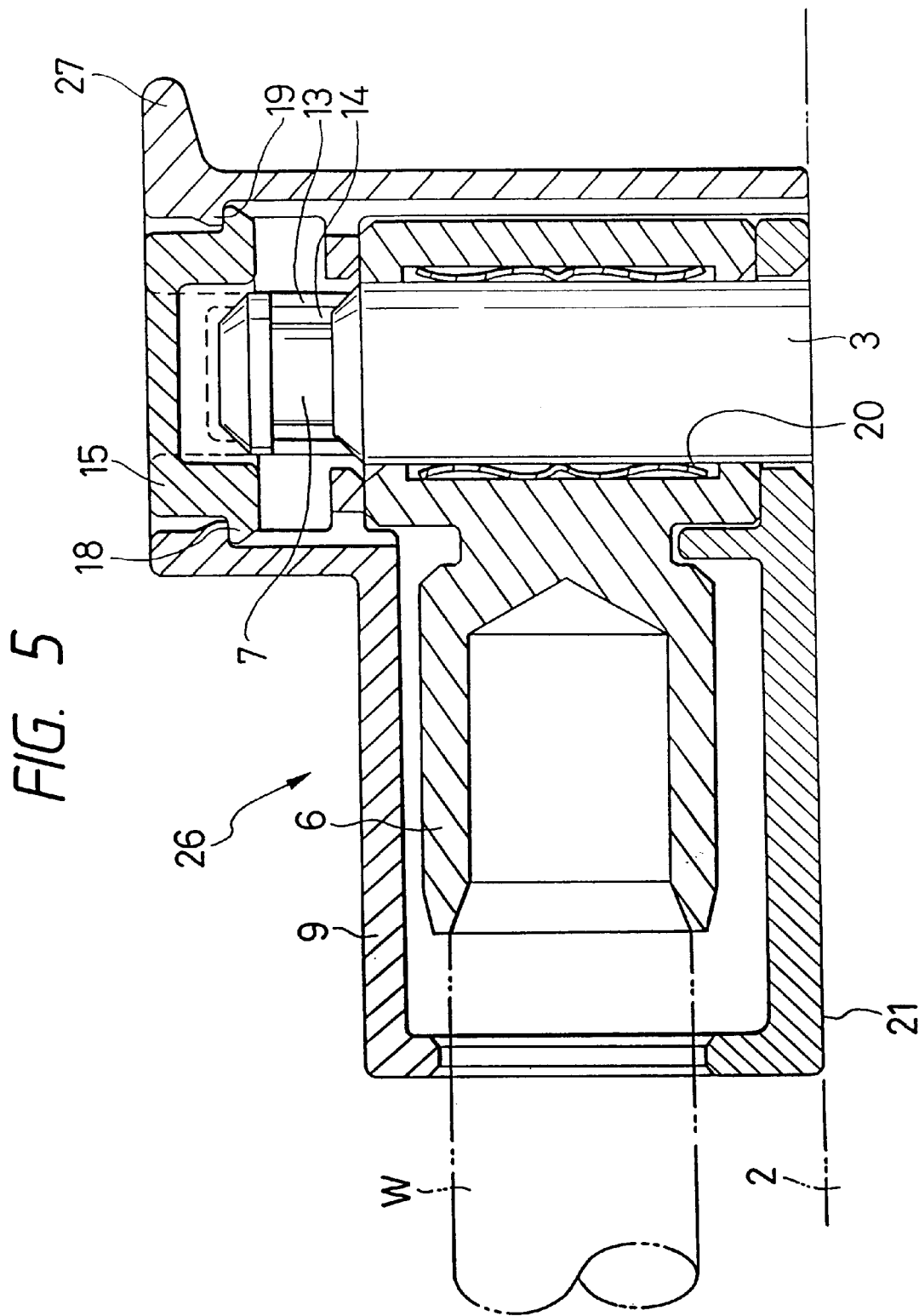
FIG. 5 is a sectional view showing a storage battery terminal structure, which is a second embodiment of the present invention.
Figure 6:
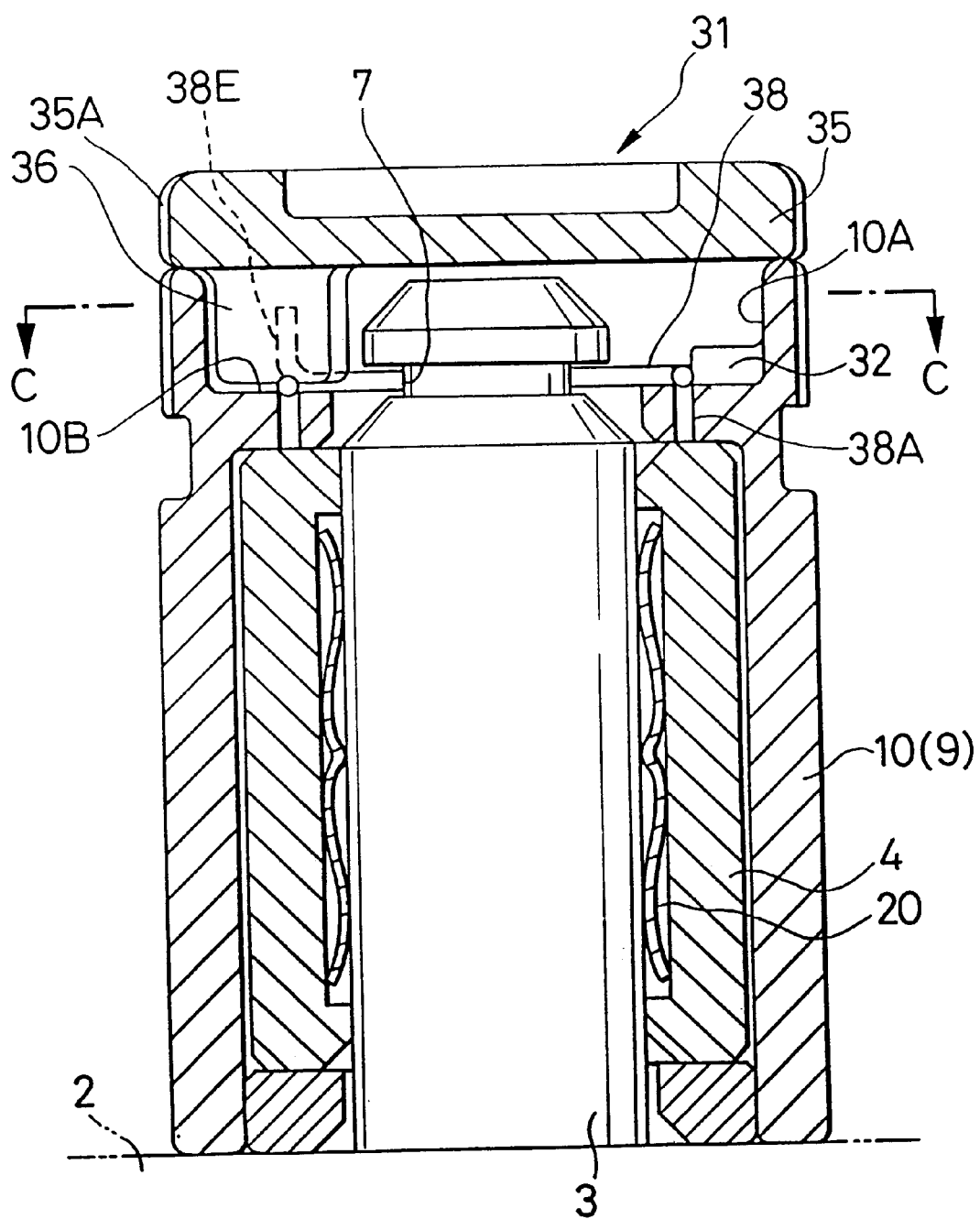
FIG. 6 is a sectional view showing a storage battery terminal structure, which is a third embodiment of the present invention.
Figure 7:
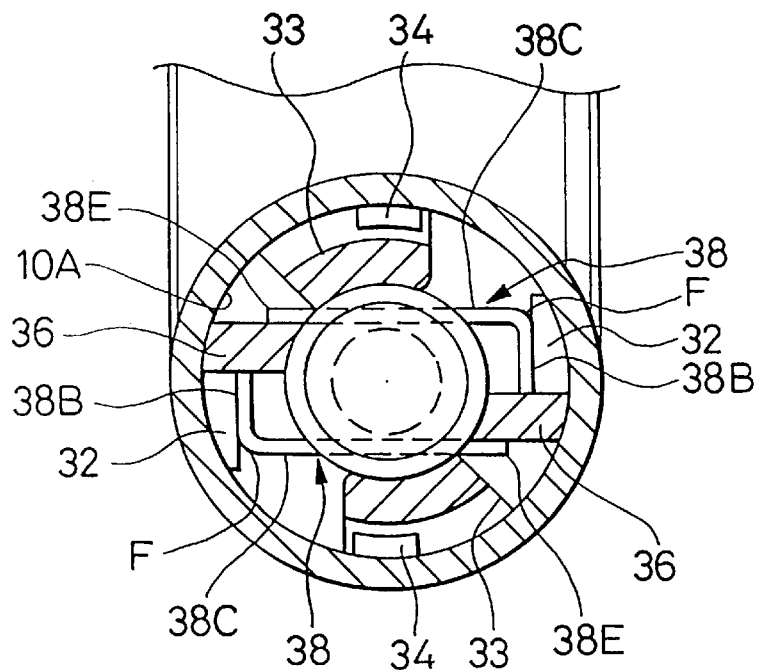
FIG. 7 is a diagram illustrative of an operation at a cross section taken along a line C—C in FIG. 6.
Figure 8:
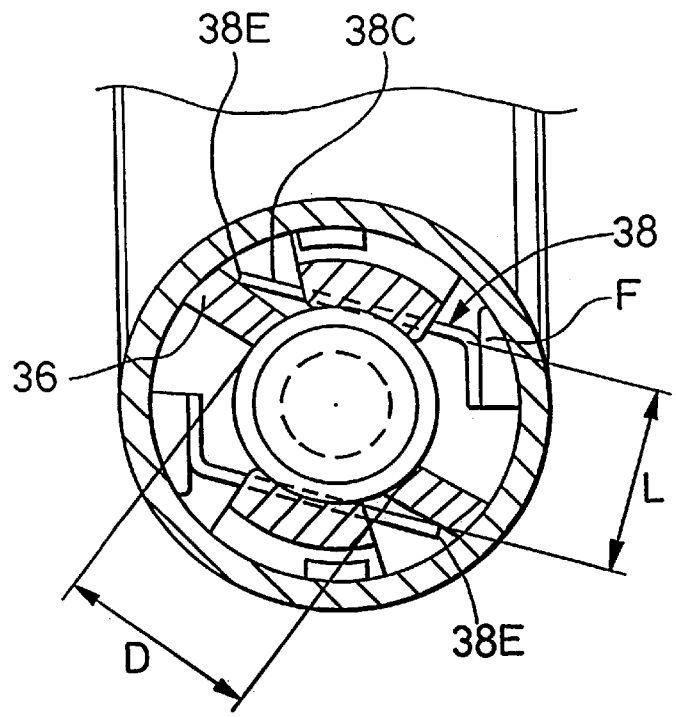
FIG. 8 is a diagram illustrative of an operation at the time of releasing in FIG. 7.
Figure 9:
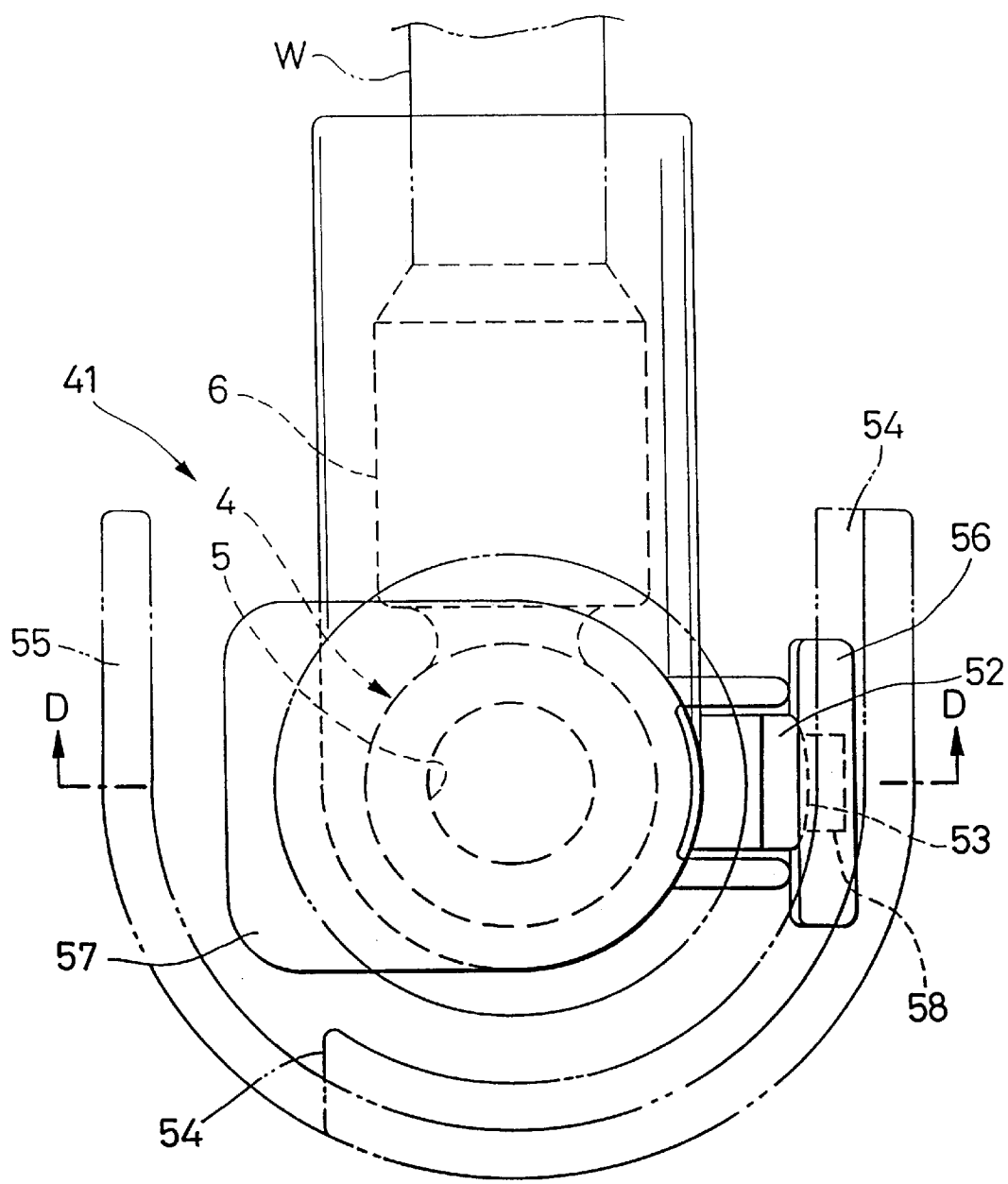
FIG. 9 is a plan view showing a storage battery terminal structure, which is a fourth embodiment of the present invention.
Figure 10:
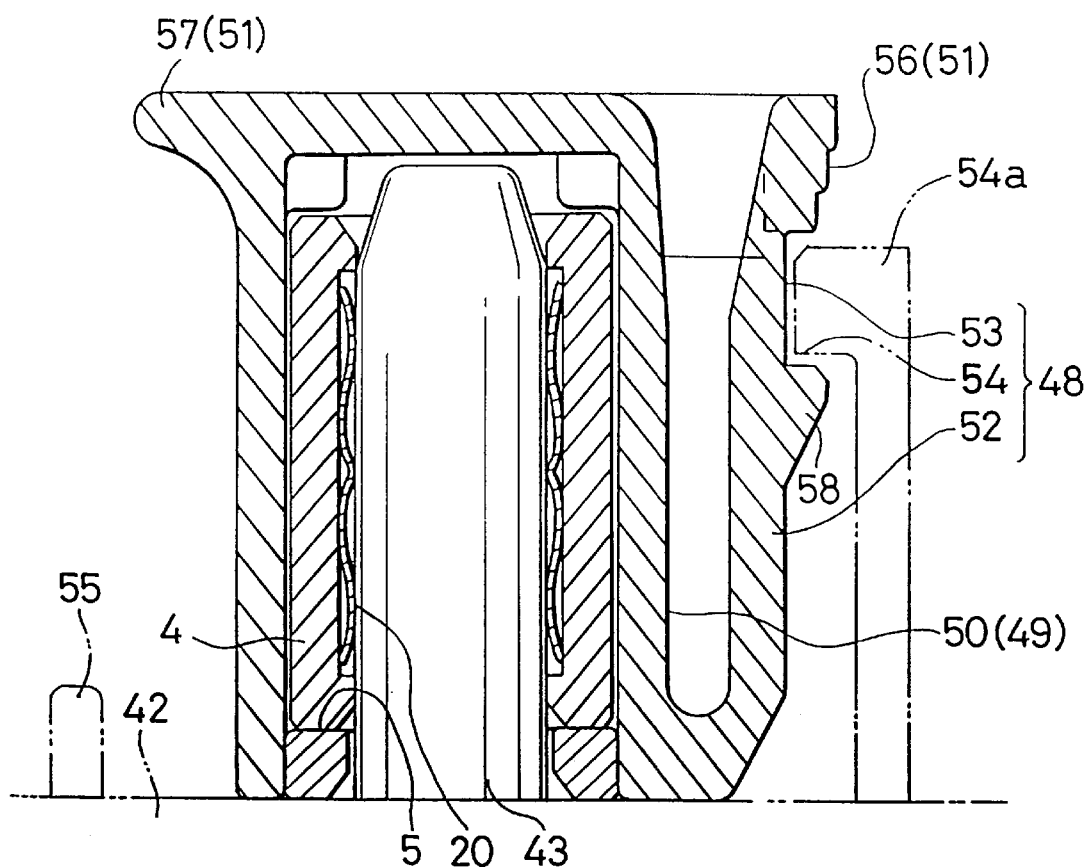
FIG. 10 is a sectional view taken along a line D—D in FIG. 9.
Figure 11:
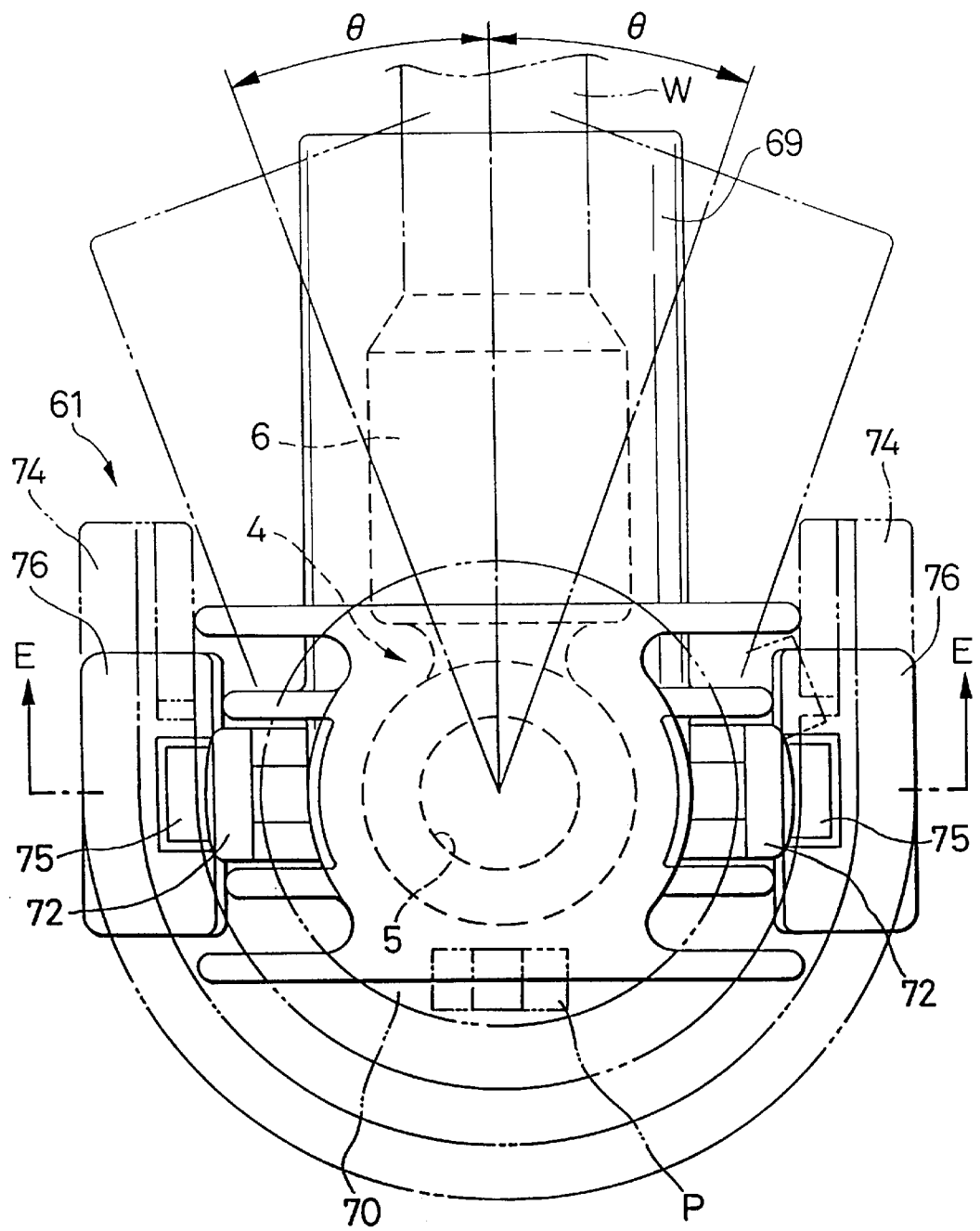
FIG. 11 is a plan view showing a storage battery terminal structure, which is a fifth embodiment of the present invention.
Figure 12:
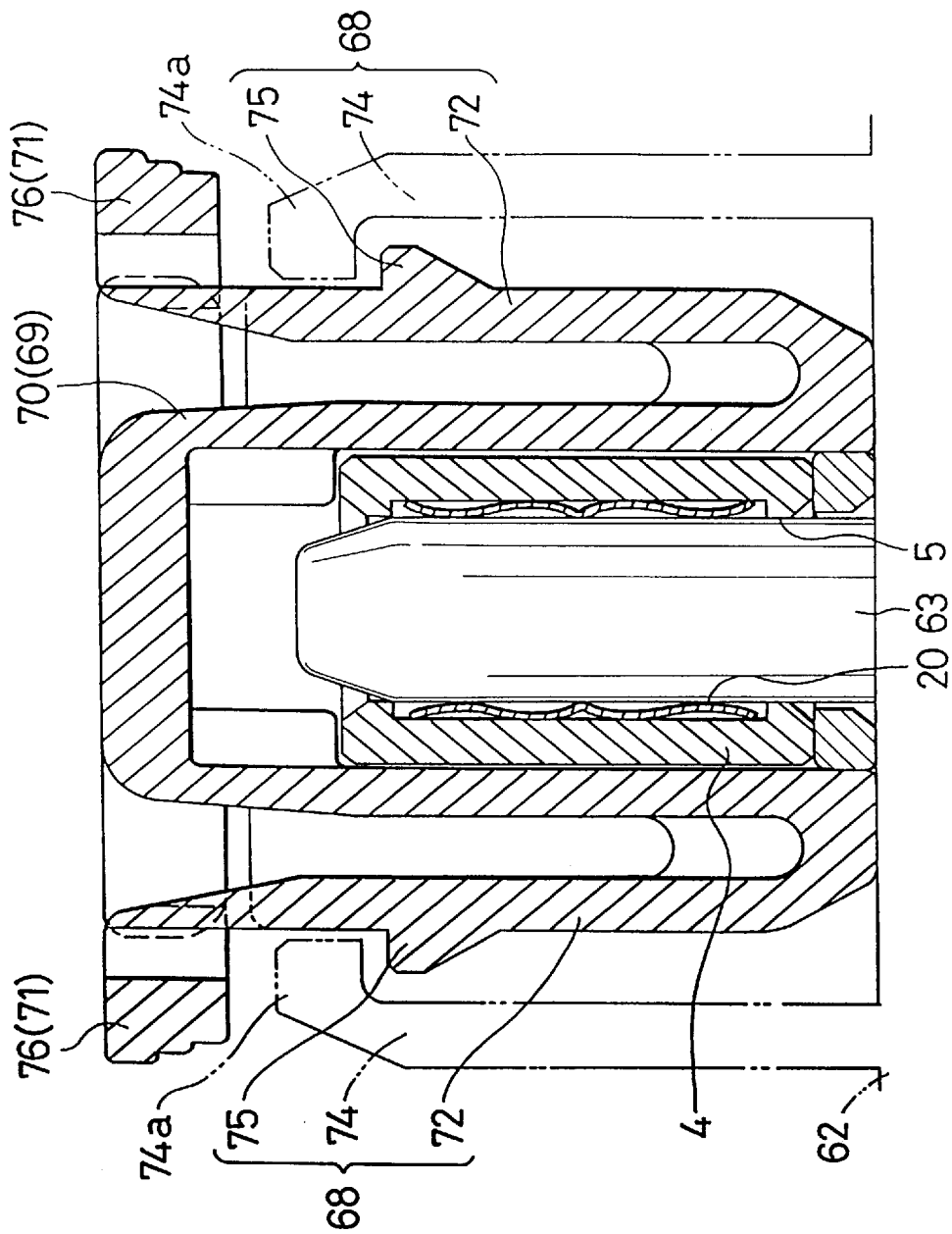
FIG. 12 is a sectional view taken along a line E—E in FIG. 11.
Figure 13:
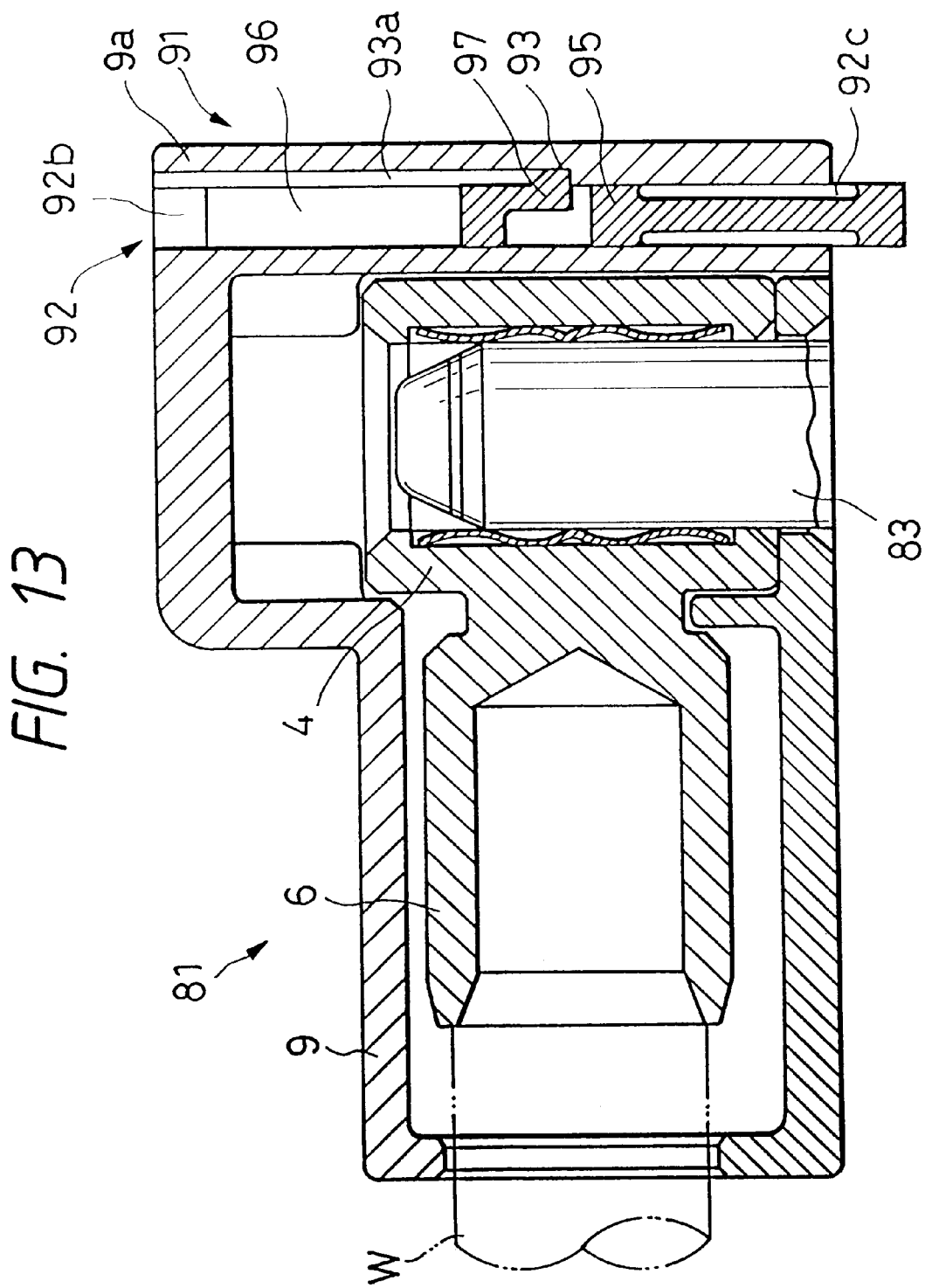
FIG. 13 is a sectional view showing a storage battery terminal structure, which is a sixth embodiment of the present invention.
Figure 14:
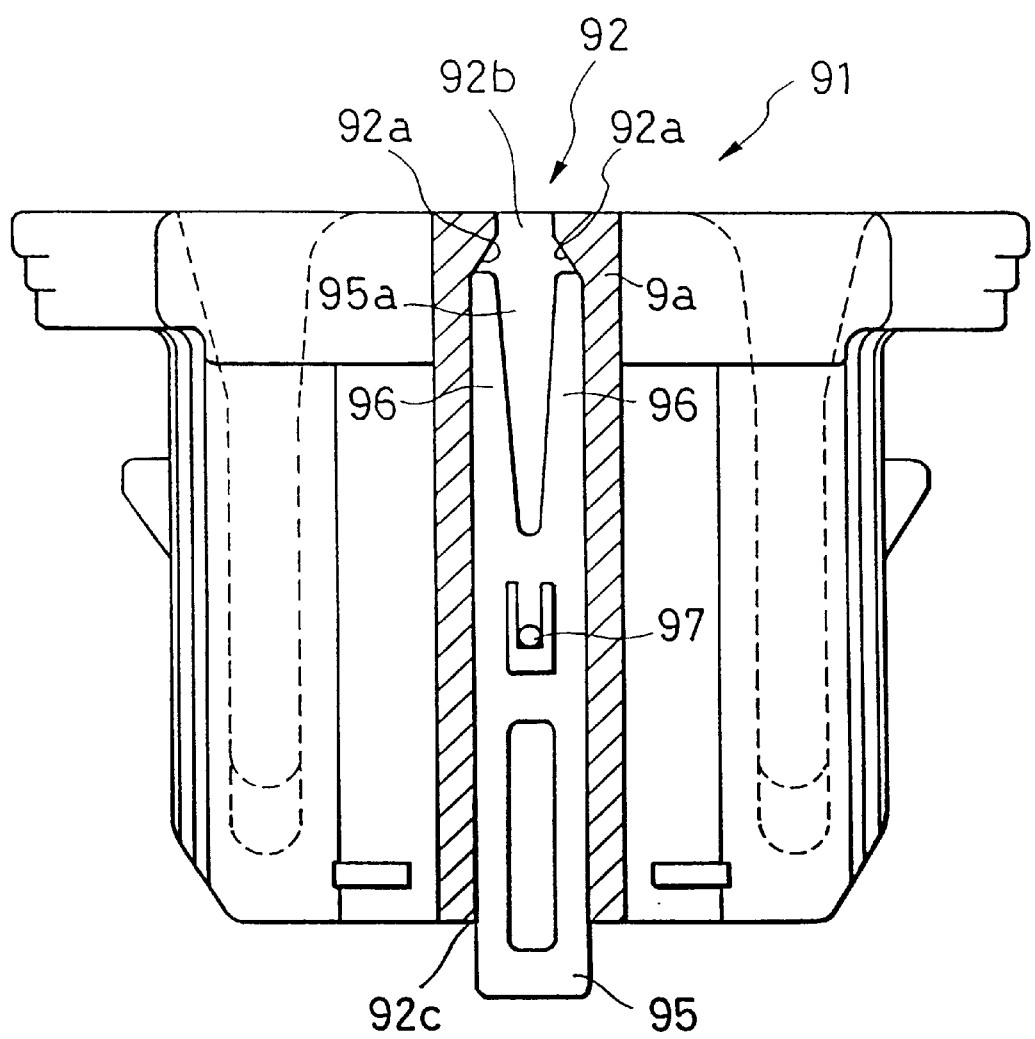
FIG. 14 is a sectional view showing a construction of an indicator.
Figure 15:
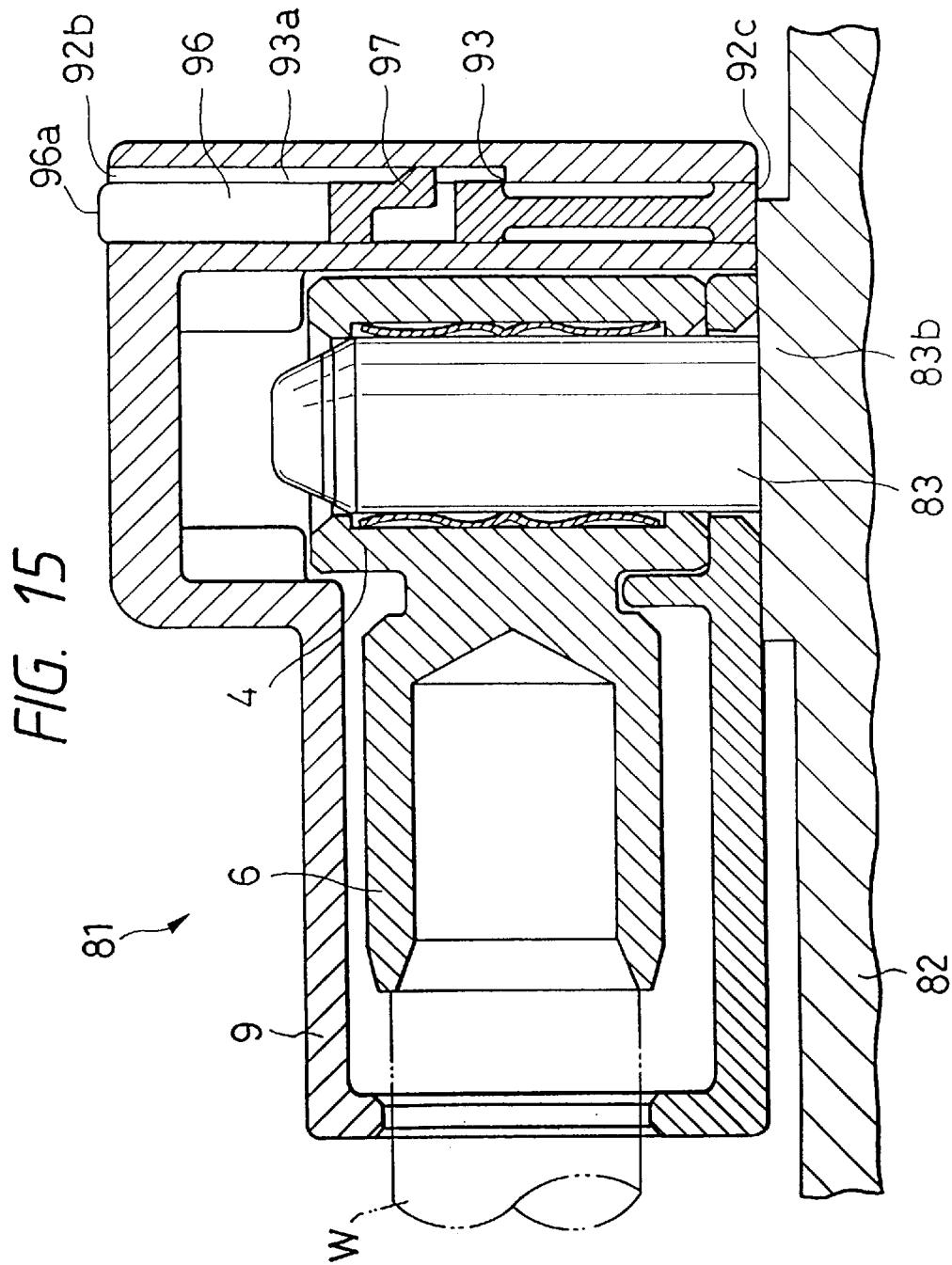
FIG. 15 is a sectional view of a storage battery terminal structure showing an operation of the indicator.
Figure 16:
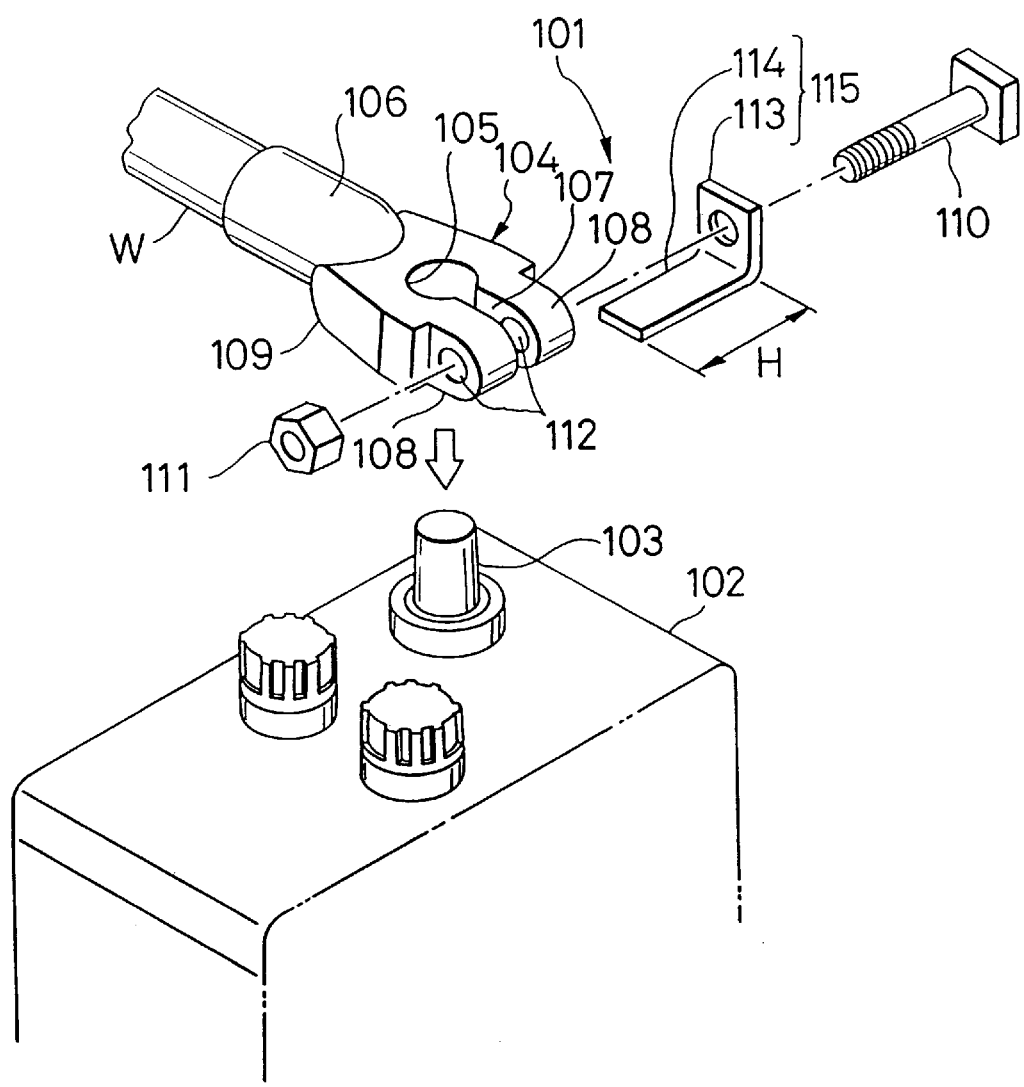
FIG. 16 is an exploded perspective view showing an example of a conventional storage battery terminal structure.

Storage battery terminal structures, which are modes of embodiment of the present invention, will now be described in detail with reference to FIGS. 1 to 10. FIG. 1 is a sectional view showing a storage battery terminal structure, which is a first of embodiment of the present invention, this sectional view being an irregularly shown sectional view taken along a line A—A; FIG. 2 is a plan view of FIG. 1; FIG. 3 is a sectional view taken along aline B—B in FIG. 2; FIG. 4 is a diagram illustrative of an operation in FIG. 1; FIG. 5 is a sectional view showing a storage battery terminal structure, which is a second embodiment of the present invention; FIG. 6 is a sectional view showing a storage battery terminal structure, which is a third embodiment of the present invention; FIG. 7 and FIG. 8 are diagrams illustrative of an operation at a cross section taken along a line C—C in FIG. 6; FIG. 9 is a plan view showing a storage battery terminal structure, which is a fourth embodiment of the present invention; FIG. 10 is a sectional view taken along a line D—D in FIG. 9; FIG. 11 is a plan view showing a storage battery terminal structure, which is a fifth of embodiment of the present invention; FIG. 12 is a sectional view taken along a line E—E in FIG. 11; FIG. 13 is a plan view showing a storage battery terminal structure, which is a sixth embodiment of the present invention; FIG. 14 is a sectional view showing a construction of an indicator in FIG. 13; and FIG. 15 is a sectional view of the storage battery terminal structure showing an operation of the indicator.

First Embodiment

A storage battery terminal structure, which is the first embodiment of the present invention will be described in detail with reference to FIGS. 1 to 3. A storage battery terminal structure 1 according to the first embodiment includes: a male terminal 3 that is erected on an upper surface of a storage battery main body 2; and a female terminal 4 that has a male terminal insertion hole 5 engageable with the male terminal 3 and a crimping portion 6 for connecting a wire W by crimping. The storage battery terminal structure 1 also includes: an annular recessed groove 7 that is arranged on an upper portion of the cylindrical male terminal 3; a housing 9 that has a retaining member 8 including the annular recessed groove 7 for retaining the female terminal 4 and that is arranged as an outer enclosing body of the female terminal; and a retainment releasing mechanism 11 that is arranged within a rigid sleeve 10 of the housing 9 surrounding the male terminal 3 in order to release retainment of the retaining mechanism 8.

Part of the retaining mechanism 8 is retaining projections 12 that are arranged over inner circumferential portions of the rigid sleeve 10. Further, the retainment releasing mechanism 11 includes: flexible arms 14, each flexible arm being formed by a pair of slits 13 that are cut from the upper end of the rigid sleeve 10 so as to interpose the corresponding retaining projection 12 therebetween; and a release button 15 that is vertically movably arranged on an upper portion of the rigid sleeve 10 so that the flexible arms 14 can be flexed and that has slopes 16 on the lower surface thereof, the slopes facing sidewards.

More specifically, slopes 17 are arranged on the upper end of the flexible arms 14 so as to facilitate sideward flexion of the flexible arms 14. The slopes 17 are brought into contact with the slopes 16. Further, when viewed from top, the release button 15 has the same outer diameter as that of the rigid sleeve 10 and projects sidewards at both wing portions that have the slopes 16, but the other portion of the release button 15 has such a small diameter as to allow itself to move vertically within the inner diameter of the rigid sleeve 10. A retaining catch 18 is arranged on the small diameter portion so as to prevent the release button from coming out upward. The retaining catch 18 is designed to be retained by a retaining catch 19 arranged on the inner wall of the rigid sleeve 10.

Further, a spring 20 is set in the male terminal insertion hole 5. The spring 20 is made of a high conductive elastic material such as phosphor bronze in order to provide electric conduction with respect to the male terminal 3. Furthermore, an anti-corrosive cover 21 is also attached to the bottom of the housing 9 by a not shown retaining means so that the female terminal 4, the male terminal 3, and the like can be protected against corrosion caused by corrosive liquids and gases.

As shown in FIGS. 1 to 3, in the thus constructed storage battery terminal structure, first, the female terminal 4 that has the wire W crimped by the wire crimping portion 6 is assembled while surrounded by the housing 9, the release button 15, and the anti-corrosive cover 21. Then, the male terminal insertion hole 5 of the female terminal 4 is pushed onto the male terminal 3 together with the rigid sleeve 10 from above. As a result, the retaining projections 12 come in contact with the tapered portion on the upper end of the male terminal 3, which in turn flexes the flexible arms 14 sidewards to thereby not only allow the retaining projections 12 to be retained in the annular recessed groove 7 but also allow the male terminal 3 to be urged by the spring 20. Hence, the female terminal 4 is connected to the male terminal 3.

Then, the following operation is performed in order to remove the female terminal 4 from the male terminal 3. As shown in FIG. 4, first, when the release button 15 is pressed downward, the slopes 16 push the slopes 17 sidewards, and the flexible arm 14 is therefore flexed sidewards. As a result, the retaining projections 12 are released from the annular recessed groove 7. If the female terminal 4 is pulled up under this condition, the female terminal 4 can be pulled out of the male terminal 3.

The aforementioned connection and release of the female terminal 4 to and from the male terminal 3 can be implemented also on adjacent pairs of female and male terminals, each pair of female and male terminals being coupled to each other through a wire W, simultaneously at a single touch without using a tool. For example, storage batteries mounted on an electric vehicle are placed so close to each other that a distance between their terminals is short. That is, even if placed in such a narrow space, storage batteries can be replaced within a short period of time, and therefore this contributes to improving operation efficiency.

Second Embodiment

A storage battery terminal structure, which is the second embodiment of the present invention, will be described next with reference to FIG. 5. A storage battery terminal structure 26 is distinguished from the storage battery terminal structure, which is the first embodiment, only in that a finger resting protuberance 27 is arranged on an upper end portion of the rigid sleeve 10 and at a position opposite to the crimping portion 6. It may be noted that the same parts and components are denoted as the same reference numerals and that their descriptions will therefore be omitted.

The storage battery terminal structure 26 according to the present of embodiment is characterized as having the finger resting protuberance 27 on the upper end portion of the rigid sleeve 10. Thus, in order to pull the female terminal 4 out of the male terminal 3, the operator puts a finger below the finger resting protuberance and presses the release button 15 down by the thumb or the like with the finger as a pivot. As a result, by pulling the finger resting protuberance directly upward, the female terminal 4 can be pulled out of the male terminal 3 easily without having to slip the fingers. Hence, operation efficiency can be further improved.

Third Embodiment

A storage battery terminal structure, which is the third embodiment of the present invention, will be described next in detail with reference to FIGS. 6 to 8. A storage battery terminal structure 31 according to the present of embodiment is distinguished from the storage battery terminal structure according to the first embodiment in the structure of the retaining mechanism 8 and that of the retainment releasing mechanism 11. It may be noted that the same parts and components are denoted as the same reference numerals and that their descriptions will therefore be omitted.

Part of the retaining mechanism of the storage battery terminal structure 31 is cantilevered springs 38 that are arranged within the rigid sleeve 10 horizontally and that are flexible sidewards. Further, the retainment releasing mechanism is constructed of a release knob 35 that is arranged on an upper end portion of the rigid sleeve 10 so as to be rotatable only by a predetermined angle and that has ribs 36 on the lower surface thereof, the ribs 36 allowing the springs 38 to flex sidewards by catching the front ends of the springs 38.

More specifically, as shown in FIGS. 6 and 7, each spring 38 has a mounting portion 38A force-fitted into a force-fit hole in a top wall 10B of the rigid sleeve 10 perpendicularly and a fixed portion 38B backed with a support strip 32 that is arranged horizontally on an inner circumferential wall 10A of the rigid sleeve 10. A flexible portion 38C extends while bent at a fulcrum F at right angles to the fixed portion 38B as viewed from top, and horizontally passes through the annular recessed groove 7 so as to touch the annular recessed groove 7. As a result, both the housing 9 and the female terminal 4 are retained by the male terminal 3. Further, the end of the flexible portion 38C is bent upward perpendicularly to form an operating point 38E.

The aforementioned release knob 35 not only is held rotatably on the upper end of the rigid sleeve 10 by a not shown retaining catch so that the release knob 35 will not come out upward, but also has its rotatable range regulated to a predetermined angle by arcuate holes 33 arranged in the top wall 10B and stoppers 34 arranged on the bottom surface of the release knob 35. Further, the outer circumference of the release knob 35 is knurled 35A so as to facilitate rotation.

Still further, as shown in FIG. 8, the ribs 36 are arranged on the lower surface of the release knob 35, so that when the release knob 35 is rotated, the ribs 36 catch the operating points 38E of the springs 38, which in turn flexes the flexible portions 38C sidewards about the fulcrums F. Therefore, the distance L between the flexible portions 38C of the pair of springs 38 becomes larger than the diameter D of the upper end portion of the male terminal 3. As a result, the springs 38 are released from the annular recessed groove 7. Hence, the housing 9 and the female terminal 4 can be pulled upward to be pulled out of the male terminal 3.

The aforementioned connection and release of the female terminal 4 to and from the male terminal 3 can be implemented also on adjacent pairs of female and male terminals, each pair of female and male terminals being coupled to each other through a wire W, simultaneously at a single touch without using a tool. Even when storage batteries are placed so close to each other that a distance between their terminals is short, i.e., even if storage batteries are placed in such a narrow space, storage batteries can be replaced within a short period of time, and therefore this contributes to improving operation efficiency.

Fourth Embodiment

A storage battery terminal structure, which is the fourth embodiment of the present invention, will be described next in detail with reference to FIGS. 9 and 10. A storage battery terminal structure 41 includes: a male terminal 43 that is erected on an upper surface of a storage battery main body 42; and a female terminal 44 that has a male terminal insertion hole 5 engageable with the male terminal 43 and a crimping portion 6 for connecting a wire W by crimping. The storage battery terminal structure 41 also includes: a housing 49 that is arranged as an outer enclosing body of the female terminal 4; a retaining mechanism 48 that is arranged between a rigid sleeve 50 of the housing 49 surrounding the male terminal 43 and the upper surface of the storage battery main body 42; and a retainment releasing mechanism 51 that is arranged on the rigid sleeve 50 in order to release the retaining mechanism 48.

More specifically, the retaining mechanism 48 includes: a flexible arm 52 that projects upward from the lower portion of the rigid sleeve 50 so as to be U-shaped; a retaining groove 53 that is arranged on an upper lateral side of the flexible arm 52; and a retaining rib 54 that has an inverted L-shaped portion engageable with the retaining groove 53 and that is erected on the upper surface of the storage battery main body 42. As shown in FIG. 9, the retaining rib 54 not only covers about ¼ the circumference of the rigid sleeve 50 but also has a lower rib 55 that is continuous thereto, so that the retaining ribs 54 and 55 cover ½ the circumference of the rigid sleeve 50 as a whole.

Further, the retainment releasing mechanism 51 includes: a finger resting stepped portion 56 that is arranged on the upper end of the flexible arm 52; and a finger resting projection 57 that is arranged on the upper end of the rigid sleeve 50 at a position opposite to the flexible arm 52.

Since the parts around the female terminal 4 are the same as those of the storage battery terminal structure 1, their descriptions will be omitted while denoted as the same reference numerals in FIGS. 9 and 10.

In the aforementioned storage battery terminal structure 41, first, the female terminal 4 having a wire W crimped by the crimping portion 6 is covered with the housing 49, and the rigid sleeve 50 portion of the housing 49 is thereafter pushed into the male terminal 43 from above. As a result, the slope of a retaining projection 58 arranged on the lower end of the retaining groove 53 of the flexible arm 52 comes in contact with an inverted L-shaped portion 54a on the upper end of the retaining rib 54, so that the flexible arm 52 is pushed inward while flexed. Then, not only the inverted L-shaped portion 54a of the retaining rib 54 is set into the retaining groove 53, but also the retaining projection 58 is retained by the lower end of the inverted L-shaped portion 54a. At this time, the flexible arm 52 in the flexed condition is returned to normal condition, and the female terminal 4 is therefore connected to the male terminal 43 reliably through the spring 20. It may be noted that some degree of freedom is given to the direction of the wire W since the retaining rib 54 covers about ¼ the circumference of the rigid sleeve 50.

Further, the female terminal 4 is separated from the male terminal 43 in the following way. When the flexible arm 52 is pushed inward with fingers put respectively on the finger resting stepped portion 56 and the finger resting projection 57, the retainment of the retaining projection 58 by the inverted L-shaped portion 54a of the retaining rib 54 is released. Therefore, by pulling the rigid sleeve 50 upward directly, the female terminal 4 can be pulled out of the male terminal 43 easily.

The aforementioned connection and release of the female terminal 4 to and from the male terminal 43 can be implemented similarly on adjacent pairs of female and male terminals, each pair of female and male terminals being coupled to each other through a wire W, through the finger resting stepped portion 56 and the finger resting projection 57 at a single touch without using a tool. Even when storage batteries are placed so close to each other that a distance between their terminals is short, i.e., even if storage batteries are placed in such a narrow space, storage batteries can be replaced within a short period of time, and therefore this contributes to improving operation efficiency.

Further, it is not necessary to machine an annular recessed groove, nor are any release button or release knob required in the male terminal 43. Therefore, inexpensive products can be provided.

Fifth Embodiment

A storage battery terminal structure, which is the fifth embodiment of the present invention, will be described next in detail with reference to FIGS. 11 and 12. A storage battery terminal structure 61 includes: a male terminal 63 that is erected on the upper surface of a storage battery main body 62; and a female terminal 4 that has a male terminal insertion hole 5 engageable with the male terminal 63 and a crimping portion 6 for connecting a wire W by crimping. The storage battery terminal structure 61 also includes: a housing 69 that is arranged as an outer enclosing body of the female terminal 4; a retaining mechanism 68 that is arranged between a rigid sleeve 70 of the housing 69 surrounding the male terminal 63 and the upper surface of the storage battery main body 62; and a retainment releasing mechanism 71 that is arranged on the rigid sleeve 70 in order to release the retaining mechanism 68.

More specifically, the retaining mechanism 68 includes: a pair of flexible arms 72 that are arranged at opposite positions with the rigid sleeve 70 as the center, the pair of flexible arms 72 projecting upward from the lower portion of the rigid sleeve 70 so as to be U-shaped; retaining projections 75 that are arranged outside the flexible arms 72; and a retaining rib 74 that has an inverted L-shaped portion 74a for retaining the retaining projections 75 and that is erected on the upper surface of the storage battery main body 62. The retaining rib 74 extends half-arcuately so as to cover about ½ the circumference of the rigid sleeve 70 as shown in FIG. 11.

Further, the retainment releasing mechanism 71 is constructed of a pair of finger resting stepped portions 76, 76 that are arranged on the upper ends of the pair of flexible arms 72, 72.

It may be noted that the same parts and components as those of the aforementioned storage battery terminal structure 41 are denoted as the same reference numerals and that their descriptions are therefore omitted.

In the aforementioned storage battery terminal structure 61, first; the female terminal 4 having a wire W crimped by the crimping portion 6 is covered with the housing 69, and the rigid sleeve 70 portion of the housing 69 is thereafter pushed into the male terminal 63 from above. As a result, the slopes of the retaining projections 75 of the flexible arms 72 come in contact with the inverted L-shaped portion 74a, so that the flexible arms 72 are flexed inward. When the rigid sleeve 70 portion is pushed directly, the retaining projections 75 are retained by the retaining rib 74. At this time, the flexible arm 72 in the flexed condition is returned to normal condition, and the female terminal 4 is therefore connected to the male terminal 63 reliably through the spring 20.

Since the retaining rib 74 covers half the circumference of the rigid sleeve 70, the wire W can be deflected only at a deflecting angle of θ (about 20° both rightward and leftward) symmetrically with the center line as shown in FIG. 11. This is because a gap is arranged between the inner lateral surface of the retaining rib 74 and the outer lateral surfaces of the retaining projections 75 so as to allow the retaining projections 75 to be locked at the time of rotation, and therefore, as the retaining projections 75 in a rotating direction come in contact with the retaining rib 74 in the same rotating direction, further rotation of the retaining rib 74 is blocked.

Further, the female terminal 4 is separated from the male terminal 63 in the following way. By flexing the pair of flexible arms 72 inward with fingers put on the pair of finger resting stepped portions 76, 76, the retaining projections 75 is disengaged from the retaining rib 74. If the rigid sleeve 70 is directly pulled upward under this condition, the female terminal 4 can be pulled out of the male terminal 63 easily.

Therefore, the aforementioned connection and release of the female terminal 4 to and from the male terminal 43 can be implemented also on adjacent pairs of female and male terminals, each pair of female and male terminals being coupled to each other through a wire W, through similar operation at a single touch without using a tool. Even when storage batteries are placed so close to each other that a distance between their terminals is short, i.e., even if storage batteries are placed in such a narrow space, storage batteries can be replaced within a short period of time, and therefore this contributes to improving operation efficiency.

Sixth Embodiment

A storage battery terminal structure, which is the sixth embodiment of the present invention, will be described next in detail with reference to FIGS. 13 to 15. A storage battery terminal structure 61 is distinguished from the storage battery terminal structures proposed in the aforementioned of embodiment in that an indicator 91 for sensing the connected condition with a male terminal 83 erected on a storage battery main body 82 is arranged.

The indicator 91 shown in FIG. 13 is arranged so as to extend along the length of the female terminal 4 on part of the outer side surface of the housing 9, and is applicable to any one of the aforementioned embodiment. When shown in relation to the fifth embodiment in particular, the indicator 91 is arranged at a position denoted as P in FIG. 11. This indicator 91 has a slide hole 92 formed so as to extend axially along an outer wall portion 9a of the housing 9, and a shuttling indication rod 95 arranged inside the slide hole 92.

As shown in FIG. 14, the slide hole 92 and the indication rod 95 are formed so as to be rectangular in cross section, and the slide hole 92 has openings on both upper and lower ends. Since slopes 92a are formed on both lateral surfaces in the wider width direction of the upper end portions of the slide hole 92, the horizontal width of the upper end opening 92b is smaller than the horizontal width of the lower end opening 92c.

It may be noted that the upper end opening 92b corresponds to the indication opening as referred to in the present invention. A stepped portion 93 for preventing the indication rod 95 from coming off is formed within the slide hole 92, and a portion above the stepped portion 93 is formed into a guide groove 93a (see FIG. 13).

On the other hand, a slit 95a is formed on the upper end portion of the indication rod 95, and both sides of the slit 95a form a pair of elastic indication strips 96 that has elasticity. Below the slit 95a is a flexible lock catch 97 that has elasticity. It may be noted that the tip of each of the pair of elastic indication strips 96 is colored to form a colored indication section 96a.

The indication rod 95 is assembled into the slide hole 92 in the following way. The indication rod 95 is inserted into the slide hole 92 from the lower end opening 92c. At this time, the whole part of the flexible lock catch 97 is flexibly deformed in the thick wall direction, so that the flexible lock catch 97 seems collapsed into the thickness of the indication rod 95. However, since the flexible lock catch 97 actually comes in pressure contact with the side surface of the slide hole 92 elastically, resistance is produced at the time of insertion.

When the flexible lock catch 97 is inserted as far as to the stepped portion 93 position, the flexible lock catch 97 returns to the original shape as shown in FIG. 13. At this moment, regular insertion of the indication rod 95 can be sensed through clicking.

Since the flexible lock catch 97 can move upward along the guide groove 93a under this condition, the whole part of the indication rod 95 can move upward as well. However, the indication rod 95 cannot move downward when the flexible lock catch 97 gets retained by the stepped portion 93, and part of the lower end of the indication rod 95 therefore stays projecting from the lower end opening 92c.

Then, an operation of the indicator 91 will be described next. The indicator 91 is connected to the male terminal 83 of the storage battery terminal structure 81 in a manner similar to the aforementioned embodiment. In this case, if the male terminal 83 is not incompletely inserted into the female terminal 4, i.e., if the male terminal 83 is in the course of being inserted into the female terminal 4, then the whole part of the indication rod 95 stays collapsed downward as shown in FIG. 13, leaving the pair of elastic indication strips 96 not reaching the upper end opening 92b.

Therefore, the operator can visibly check defective connection, so that he can continue to insert the female terminal 4.

By the way, as shown in FIG. 15, a terminal seat 83b is arranged on the base portion of the male terminal 83. If the female terminal 4 is inserted into the male terminal 83 continuously, the height of the indication rod 95 remains unchanged and the position of the whole part of the storage battery terminal structure 81 moves downward when the lower end of the indication rod 95 has come in contact with the terminal seat 83b.

In association with this movement, the pair of elastic indication strips 96 are flexibly deformed inward by the action of the slopes 92a, and gradually come closer to the upper end opening 92b. When the female terminal 4 has been inserted into the male terminal 83 completely, in other words, when the storage battery terminal structure 81 is connected to the storage battery main body 82 regularly, the pair of elastic indication strips 96 project from the upper end opening 92b. In addition, since the upper surfaces of the pair of elastic indication strips 96 are colored to form the colored indication sections 96a, the operator can sense complete insertion of the female terminal into the male terminal.

Thus, the storage battery terminal structure 81 having the indicator 91 shown in the present embodiment allows the operator to check the connection of the storage battery terminal structure to the storage battery main body 82 easily. Therefore, incomplete connection can be prevented.

In the case where the storage battery terminal structure 81 is removed from the male terminal 83, when the tips of the indication rod 95 projecting from the upper end opening 92b, i.e., the colored indication sections 96a are pressed, the indication rod 95 is inserted into the slide hole 92 as a whole by the action of the slopes 92a formed on the upper sides of the slide hole 92. However, since the flexible rock catch 97 is retained by the stepped portion 93, the indication rod 95 will in no way come off from the slide hole 92. As a result, the indication rod 95 can be reused the way it is.

The present invention is not limited to the aforementioned embodiment, but may be embodied also in other embodiment while appropriately modified. For example, while the retaining rib 54 arranged on the storage battery main body 42 is arcuate as viewed from top as shown in FIG. 9 in the fourth embodiment, the retaining rib 54 may not necessarily be arcuate as long as adjacent storage batteries are positioned fixedly, and only one retaining rib may be sufficient.

In the aforementioned storage battery terminal structures according to the present invention, the female terminal is connected to the male terminal with the female terminal being retained in the annular recessed groove by the retaining projections, the annular recessed groove being arranged on the male terminal and the retaining projections serving as part of the retaining mechanism arranged on the housing that is an outer enclosing body of the female terminal. Therefore, tightening operation is not required, which in turn allows the operator to perform mounting operation at a single touch.

Further, the female terminal is removed from the male terminal by pressing the release button downward to thereby flex the flexible arms sidewards, the release button serving as the retainment releasing mechanism arranged within the rigid sleeve of the housing. As a result, retainment of the retaining projections can be released from the annular recessed groove at a single touch without using a tool. Therefore, removing operation efficiency can be improved even in a narrow place.

In the aforementioned storage battery terminal structures according to the present invention, the finger resting protuberance is arranged on the upper end portion of the rigid sleeve. Therefore, in order to pull the female terminal out of the male terminal, a finger is put on the bottom of the finger resting protuberance and the release button is pressed downward by the thumb or the like with the finger as a pivot. Therefore, when the finger resting protuberance is pulled up directly, the female terminal can be pulled out of the male terminal easily without having to slip the fingers. Hence, removing operation efficiency can be further improved.

In the aforementioned storage battery terminal structures according to the present invention, the female terminal is connected to the male terminal with the female terminal being retained in the annular recessed groove by the springs, the annular recessed groove being arranged on the male terminal and the springs serving as part of the retaining mechanism arranged on the housing that is an outer enclosing body of the female terminal. Therefore, tightening operation is not required, which in turn allows the operator to perform mounting operation at a single touch without using a tool.

Further, the female terminal is removed from the male terminal by rotating the release knob to thereby flex the springs sidewards, the release knob serving as the retainment releasing mechanism arranged within the rigid sleeve of the housing. As a result, retainment of the female terminal in the annular recessed groove by the springs can be released at a single touch without using a tool. Therefore, removing operation efficiency can be improved even in a narrow place.

In the aforementioned storage battery terminal structures according to the present invention, the female terminal can be connected to the male terminal at a single touch by pushing down the female terminal covered by the housing from above the male terminal, and the female terminal can be removed from the male terminal easily without using a tool by pulling the female terminal up with the finger resting stepped portions flexed inward while putting the fingers on the finger resting protuberances. Therefore, even in a narrow space with a distance between the terminals being short, the storage batteries can be replaced within a short period of time, which in turn contributes to improving operability.

Further, the annular recessed groove is no longer required to be machined in the male terminal, and no release button nor release knob is required. As a result, inexpensive products can be provided.

In the aforementioned storage battery terminal structures according to the present invention, the female terminal can be connected to the male terminal at a single touch by pushing down the female terminal covered by the housing from above the male terminal, and the female terminal can be removed from the male terminal easily without using a tool by pulling the female terminal up with the pair of flexible arms flexed inward while putting the fingers on the pair of finger resting stepped portions. Therefore, even in a narrow space with a distance between the terminals being short, the storage batteries can be replaced within a short period of time, which in turn contributes to further improving operability.

Further, according to the storage battery terminal structures of the present invention, when the storage batter terminal structure is connected to the male terminal regularly, the colored indication portions of the indication rod forming the indicator project from the upper end opening of the slide hole, thereby allowing the operator to visibly check complete connection. In the case of incomplete connection, the colored indication portions cannot be visible checked. Therefore, the operator can check the connection through the colored indication portions, which in turn contributes to preventing defective connection.

Further, a stepped portion is formed within the slide hole, and a flexible lock catch that prevents the coming off from the slide hole while retained by the stepped portion is formed in the indication rod. Therefore, the indication rod will in no way come out not only with the storage battery terminal structure removed from the male terminal but also during transportation or operation. Hence, operability can be improved, and the indication rod can be reused.

What is claimed is:

1. A storage battery terminal structure comprising:
    a male terminal erected on an upper surface of a storage battery main body;
    a female terminal having a male terminal insertion hole engageable with the male terminal and a crimping portion for connecting a wire by crimping;
    an cylindrical annular recessed groove arranged on an upper end portion of the male terminal;
    a housing serving as an outer enclosing body for the female terminal;

a retaining mechanism, for retaining the female terminal, including the cylindrical annular recessed groove, the retaining mechanism provided with the housing; and a retainment releasing mechanism arranged within a rigid sleeve of the housing surrounding the male terminal in order to release retainment of the retaining mechanism.

2. A storage battery terminal structure according to claim 1, wherein the retaining mechanism includes retaining projections arranged over inner circumferential portions of the rigid sleeve, and the retainment releasing mechanism includes:

flexible arms, each flexible arm formed by a pair of slits being cut from an upper end of the rigid sleeve so as to interpose the corresponding retaining projection therebetween; and a release button arranged on an upper end portion of the rigid sleeve so as to be vertically movable so that the flexible arms are flexed sidewards, and having slopes on a lower surface thereof, the slopes facing sidewards.

3. A storage battery terminal structure according to claim 2, further comprising:

a finger resting protuberance arranged on an upper end portion of the rigid sleeve at a position opposite to the crimping portion.

4. A storage battery terminal structure according to claim 1, wherein the retaining mechanism includes cantilevered springs not only being arranged horizontally within the rigid sleeve 10 but also being flexible sidewards, and wherein the retainment releasing mechanism includes:

a release knob arranged on an upper end portion of the rigid sleeve so as to be rotatable only by a predetermined angle, and having ribs that flex front ends of the springs sidewards by catching the front ends of the springs.

\* \* \* \* \*